United States Patent [19]

Neveux

[11] 4,210,835
[45] Jul. 1, 1980

[54] FAN WITH A COOLED MOTOR

[75] Inventor: René R. Neveux, Les Clayes-sous-Bois, France

[73] Assignee: Societe Anonyme Francaise du Ferodo, Paris, France

[21] Appl. No.: 858,061

[22] Filed: Dec. 6, 1977

[30] Foreign Application Priority Data

Dec. 13, 1976 [FR] France .................. 76 37449

[51] Int. Cl.² .......................................... H02K 9/06
[52] U.S. Cl. ..................... 310/62; 310/72; 165/122
[58] Field of Search ............. 310/67, 58, 59, 62, 310/63, 72, 52, 89; 417/368; 165/121, 122

[56] References Cited

U.S. PATENT DOCUMENTS

| 1,068,246 | 7/1913 | Kells | 165/121 |
|---|---|---|---|
| 2,294,586 | 9/1942 | Troller | 310/63 |
| 2,690,513 | 9/1954 | Tamm | 310/62 |
| 3,093,189 | 6/1963 | Panthoffer | 165/122 |
| 3,199,580 | 8/1965 | Vaughn | 165/122 |
| 3,260,873 | 7/1966 | Wilson | 310/72 |
| 3,303,995 | 2/1967 | Boeckel | 417/368 |
| 3,978,354 | 8/1976 | Lee | 310/63 |
| 4,118,646 | 10/1978 | Fleming | 310/62 |
| 4,163,163 | 7/1979 | Gurevich | 310/62 |

Primary Examiner—R. Skudy

[57] ABSTRACT

Motor-fan unit, particularly for the cooling of the circulation water of an automobile vehicle motor, comprising a helicoid fan driven by an electric motor. A centrifugal interior blading draws in the air through the electric motor to cool it and drives this air back into a volute surrounding the axis of the motor-fan unit. The volute opens at the same side as the electric motor in relation to the vanes of the helicoid fan. An electrical resistor, usable for making the motor-fan unit turn at reduced speed, can be placed in the volute or at the outlet of the volute to be cooled by the air stream.

4 Claims, 5 Drawing Figures

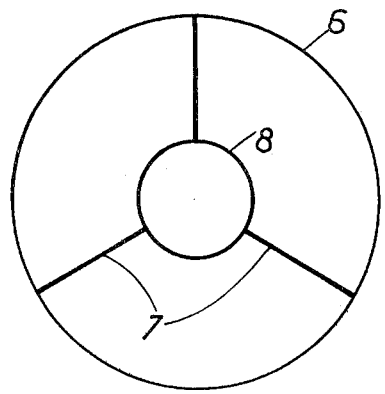
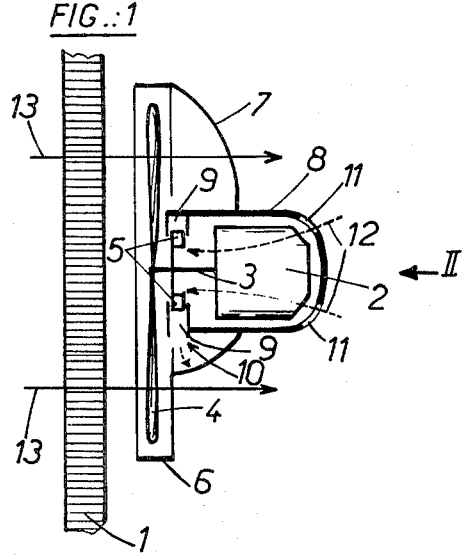
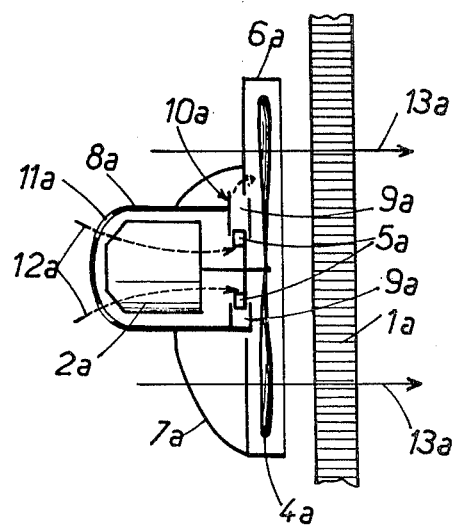

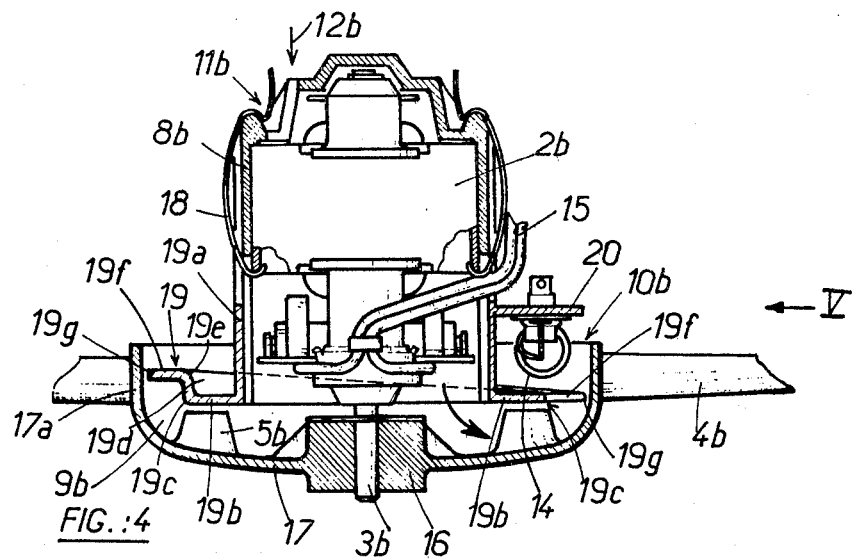

FAN WITH A COOLED MOTOR

BACKGROUND OF THE INVENTION

The invention relates to motor-fan units comprising a helicoid fan driven by an electric motor, and applies to those which are used to cool the motors of automobile vehicles. More precisely, it concerns the cooling of the electric motor.

Often this cooling cannot be ensured by the air stream created by the fan thereby posing problems. As a matter of fact, it is known that a helicoid fan has an output distinctly lower near its hub than near its periphery, so that it produces a mask effect and so that the air stream circulating against or in the electric driving motor may be insufficient to cool it properly. It is particularly the case with motor-fan units used for producing or speeding up the air stream passing through the radiator for cooling the circulation water of an automobile vehicle motor, in which the electric motor driving the fan often works with a mediocre output, especially if it is a two speed motor, and consequently dissipates a significant quantity of energy as heat.

Two speed motor-fan units, in which the slow speed is obtained by connecting a resistor in series in the supply circuit of the electric motor, poses, moreover, the problem of cooling this resistor. In addition, the fan of an apparatus for cooling by water is placed either in front of the radiator in order to blow the air through the latter or behind in order to draw the air through it. In the first instance, the electric motor is often at the suction side of the fan; in the second instance, this motor is often at the output side. The cooling apparatus of the electric motor must therefore be installed with due regard paid to the direction of the flow, in relation to this motor, of the air stream created by the helicoid fan.

SUMMARY OF THE INVENTION

The essential aim of the invention is to allow realization of a motor-fan unit whose motor is efficiently cooled. Another aim is to ensure cooling of the resistor of a two speed motor-fan unit. Yet another aim is to allow realization of a motor-fan unit whose motor is efficiently cooled whether placed at the output side or at the suction side of the helicoid fan.

It has been proposed to place passages in the hub or in the neighborhood of the axis of the helicoid fan to form a centrifugal or helicocentrifugal fan driving back in the same direction as the helicoid fan. The proposal has been made to either increase the output and the output pressure in a helicoid fan, or lessen the resistance given to the outflow of an airstream by a helicoid fan when arrested or wind-driven, while avoiding driving air back upstream.

In conformance with the present invention, an interior blading forming a centrifugal fan is connected in the same way to the helicoid fan. However, the fan draws the air through the electric motor and drives it back into a volute surrounding the axis of the motor-fan unit. The volute opens on the same side as the motor in relation to the vanes of the helicoid fan.

The air discharge by the volute is at a static pressure far greater than that of the air driven back by the helicoid fan. If, therefore, the direction of rotation is such that the opening of the volute is at the output side of the helicoid fan, there is no risk of the flow of air driven back by the latter blocking the outlet of the flow of the cooling air of the electric motor. The direction of rotation can be reversed, the air driven back by the centrifugal fan being then drawn in by the helicoid fan, with no risk of this air being drawn in again through the motor by this centrifugal fan.

In the case of a two speed motor, the "slow speed" resistance is advantageously placed in the volute or at the outlet of the latter, which allows cooling of the resistor to be ensured, while keeping it enclosed and protected.

BRIEF DESCRIPTION OF DRAWINGS

The description which follows, with regard to the attached drawings given by way of non-limiting example, will make the way in which the invention can be realised completely comprehensible, the details which appear, as much as the drawings of the text, forming, of course, part of the said invention.

FIG. 1 represents diagrammatically a motorfan unit according to the invention, seen in section through the axis, and shows the flow of the air when the fan draws in the air through a radiator.

FIG. 2 is a diagrammatic view in plan along the arrow II of FIG. 1.

FIG. 3 is a similar view to FIG. 1, showing a fan blowing the air through a radiator.

FIG. 4 is a view in section of an embodiment of a motor-fan according to the invention.

FIG. 5 is a partial view along arrow V of FIG. 4, the rotor being seen partially in section.

DETAILED DESCRIPTION

The motor-fan unit of FIGS. 1 and 2 is intended to draw the air through a radiator 1 where the cooling water of the motor-fan unit comprises an electric motor 2, shaft 3, vanes 4 of an axial-flow helicoid fan and a blading 5 of a centrifugal compressor. Collar or shroud 6 surrounds helicoid fan or vanes 4 and is fixed behind radiator 1 by means not represented. Arms 7 connect collar or shroud 6 to a housing 8 in which is fixed electric motor 2. The centrifugal compressor blading 5 is surrounded by volute 9 which has an outlet orifice 10 and is located behind the trailing edge of vanes 4. Volute 9 is fixed to the front of the housing 8 having openings 11 at the back thereof.

When the motor-fan unit is driven in rotation, a flow of cooling air enters through openings 11. Air flow 12 circulates from back to front to cool motor 2 and is drawn in by centrifugal blading 5 which impels it into diffuser volute 9 through which air flow 12 is slowed down before issuing from opening 10 at a static pressure far greater than that of the principal air flow which is discharged rearwardly by vanes 4 after being drawn in through radiator 1. Consequently, the pressure of air flow 13 cannot prevent air flow 12 from issuing at opening 10.

FIG. 3 shows the same elements designated by the same reference numbers bearing the index a. A motor-fan unit is disposed in such a way as to blow an air flow 13a through radiator 1a. Air flow 12a, issuing at openings 10a from the centrifugal compressor formed by volute 9a and blades 5a, is taken up again by vanes 4a of the helicoid fan, which drive it back with flow 13a through radiator 1a. Consequently, there is no risk of flow 12a being recycled through openings 10a and motor 2a. Therefore, an identical motor-fan unit could be mounted either as in FIG. 1 or as in FIG. 3 and it would be sufficient, at least theoretically, to reverse the direction of rotation of the motor to change from the installation in FIG. 1 to that of FIG. 3. An identical profile of vanes, however, does not allow the obtaining of a good efficiency in the two directions of rotation. In practice, preference will consequently be given to providing two types of rotor whose vanes are suitable respectively for the installation of FIG. 1 and for that of FIG. 3 whereas a single type of overall motor unit 2-5-8-9 is suitable for driving whatever type of fan 4.

FIGS. 4 and 5 show the elements playing the same part as in FIG. 1 designated by the same reference numbers bearing the index b. As in conventional dual-speed arrangements for current fan driving motors, an electric resistor 14 is switchable into the energizing circuit 15 of motor 2b whenever it is desirable to reduce the rotation speed of the motor-fan unit. The rotor of the fan comprises a hub 16 fixed to a shaft 3b of the motor and integral with a rotary bell-shaped first wall or "head" 17 which supports the helicoid for vanes 4b and centrifugal blading 5b. The "head" or first wall 17 comprises a disc having a peripheral part 17a curved toward the motor. Vanes 4b are fixed to the outside of curved peripheral part 17a and blades 5b are fixed to the inside of first wall 17.

Motor 2b is fixed in cylindrical housing 8b by clamps 18. Volute 9b is delimited, inside peripheral part 17a, by a piece 19 which comprises a cylindrical skirt 19a integral with housing 8b and carrying an annular flange 19b extending radially outwardly therefrom to a circular outer edge 19c connected to a stationary second wall 19d. This second wall 19d is parallel to skirt 19a and has a progressively increasing height from the circular outer edge 19c to an opposite helix shaped edge 19e, to end with a stationary helical third wall 19f.

This third wall 19f extends radially up to an outer edge 19g, also forming a helix in the immediate vicinity of the bell-shaped first wall 17a, while leaving enough clearance inside the latter to allow its rotation. The volute 9b is thus formed by the space defined between the first wall 17, the second wall 19d and the third wall 19f. Therefore, this space has a cross-section which gradually increases from its beginning up to the outlet 10b.

At this outlet 10b (FIG. 5), the helical third wall 19f bends sharply at 19h and is integrally formed with a support means 20 to which resistor 14 is secured. Thus, resistor 14 is immersed within the air flow 12b impelled by blading 5b and channeled through volute 9b, and thereby is efficiently cooled. Air flow 12b has a relatively low output. Consequently, the presence of resistor runs no risk of producing a disagreeable noise, which would be produced if it were immersed in the flow of air extracted by vanes 4b. In addition, the walls 17a, 19b and 20 protect the resistor against shocks.

It is evident that the mode of realization described is only an example and that it could be modified, particularly by substitution of equivalent techniques, without thereby going beyond the scope of the invention. In particular, the resistor could be placed in the volute and not at the outlet of the latter.

I claim:

1. In a motor-fan unit for an automobile engine cooling system, said unit including an electric motor having an energizing circuit, and a rotary helicoid fan driven by said electric motor, the combination comprising:
   (a) a rotary centrifugal blading fitted in a central area of said helicoid fan and driven in conjunction therewith by said electric motor to impel air,
   (b) means whereby the air impelled by said centrifugal blading is caused to flow over said electric motor and cool the same,
   (c) a volute fixed with respect to said unit and extending around the rotary centrifugal blading and being effective to receive the air impelled by the blading,
   (d) air outlet means on said helicoid fan which is adjacent to the electric motor,
   (e) said outlet means being effective to discharge said air received by said volute out of said volute at said helicoid fan side.

2. In a motor-fan unit as claimed in claim 1, wherein the energizing circuit of said motor includes an electrically connected electrical resistor supported at a location adjacent said air outlet means of said volute for immersion within the air impelled therethrough.

3. In a motor-fan unit as claimed in claim 1, wherein a rotary bell-shaped first wall means forms a hollow rotor which carries on the outside thereof said helicoid fan and carries on the inside thereof said centrifugal blading,
   a stationary housing carries said electric motor and has an annular flange extending radially outwardly from said stationary housing to a circular outer edge located generally opposite the trailing edge of said centrifugal blading,
   a stationary second wall extends axially away from said centrifugal blading from said circular edge to a helix-shaped edge, and
   a stationary helical third wall extends radially from said helix-shaped edge to the immediate vicinity of said bell-shaped first wall means,
   whereby said first wall means and said second and third walls together bound said volute.

4. In a motor-fan unit as claimed in claim 3, wherein a support means is integrally formed with said helical third wall,
   the energizing circuit includes an electrically connected electrical resistor carried by said support means adjacent said air outlet means of said volute for immersion within the air impelled therethrough.

* * * * *